US012453866B2

(12) United States Patent
Hakala et al.

(10) Patent No.: US 12,453,866 B2
(45) Date of Patent: Oct. 28, 2025

(54) DETECTING ANOMALOUS DOSE VOLUME HISTOGRAM INFORMATION

(71) Applicant: Siemens Healthineers International AG, Steinhausen (CH)

(72) Inventors: Mikko Hakala, Rajamaki (FI); Esa Kuusela, Espoo (FI); Elena Czeizler, Helsinki (FI); Shahab Basiri, Siuntio (FI); Maria Cordero Marcos, Espoo (FI); Hannu Laaksonen, Espoo (FI); Alexander E. Maslowski, Peachtree City, GA (US)

(73) Assignee: Siemens Healthineers International AG, Steinhausen (CH)

( * ) Notice: Subject to any disclaimer, the term of this patent is extended or adjusted under 35 U.S.C. 154(b) by 711 days.

(21) Appl. No.: 17/853,454

(22) Filed: Jun. 29, 2022

(65) Prior Publication Data

US 2024/0001138 A1   Jan. 4, 2024

(51) Int. Cl.
*A61N 5/10* (2006.01)
*G09G 3/00* (2006.01)

(52) U.S. Cl.
CPC ......... *A61N 5/1031* (2013.01); *A61N 5/1038* (2013.01); *A61N 5/1048* (2013.01); *G09G 3/00* (2013.01); *A61N 2005/1074* (2013.01)

(58) Field of Classification Search
CPC ........ A61N 5/10; A61N 5/103; A61N 5/1031; A61N 5/1037; A61N 5/1038; A61N 2005/1041; A61N 5/1042; A61N 5/1045; A61N 5/1047; A61N 5/1048; A61N 5/1049; A61N 5/1065; A61N 5/1067; A61N 5/1069; A61N 5/107; A61N 5/1071; A61N 2005/1072; A61N 2005/1074; A61N 5/1064

(Continued)

(56) References Cited

U.S. PATENT DOCUMENTS 6,546,073 B1 * 4/2003 Lee ............... A61N 5/1031
378/65
7,362,848 B2 * 4/2008 Saracen ........... A61N 5/1038
378/65

(Continued)

FOREIGN PATENT DOCUMENTS

CN        107441637 B     6/2019

OTHER PUBLICATIONS

International Search Report and Written Opinion from International Patent Application No. PCT/EP2023/066695 dated Aug. 30, 2023; 13 pages.

*Primary Examiner* — Allen C. Ho
(74) *Attorney, Agent, or Firm* — Fitch, Even, Tabin & Flannery LLP (57) ABSTRACT

A control circuit accesses a radiation treatment plan for a given patient. The control circuit then generates dose volume histogram information as a function of the radiation treatment plan and automatically assesses the dose volume histogram information to identify any anomalous results. Generating that information can comprise, at least in part and for example, generating at least one dose volume histogram curve. The latter may comprise generating at least one dose volume histogram curve for each of a plurality of different patient structures (such as one or more treatment volumes and/or one or more organs-at-risk).

20 Claims, 3 Drawing Sheets

(58) Field of Classification Search
USPC .......................................................... 378/65
See application file for complete search history.

(56) References Cited

U.S. PATENT DOCUMENTS

| | | | | |
|---|---|---|---|---|
| 7,609,809 B2* | 10/2009 | Kapatoes | ............... | A61N 5/103 378/65 |
| 7,831,289 B2* | 11/2010 | Riker | ................... | A61N 5/1031 378/65 |
| 9,019,307 B1* | 4/2015 | Grimm | ............... | A61N 5/1031 345/629 |
| 9,409,039 B2* | 8/2016 | Hartman | ............. | A61N 5/1031 |
| 9,507,886 B2* | 11/2016 | Fiege | .................... | G06N 3/126 |
| 9,731,147 B2* | 8/2017 | Nord | .................... | A61N 5/1038 |
| 10,046,177 B2* | 8/2018 | Sjölund | ............... | A61N 5/1038 |
| 10,080,911 B2* | 9/2018 | Zankowski | .......... | A61N 5/1031 |
| 10,252,081 B2* | 4/2019 | Kauppinen | .......... | A61N 5/1042 |
| 10,449,388 B2* | 10/2019 | Yin | ........................ | A61N 5/103 |
| 10,485,988 B2* | 11/2019 | Kuusela | ............... | A61N 5/1077 |
| 10,603,511 B2* | 3/2020 | Bzdusek | ............... | A61N 5/103 |
| 10,625,096 B2* | 4/2020 | Peltola | ................. | A61N 5/1031 |
| 10,744,342 B2* | 8/2020 | Nord | .................... | A61N 5/103 |
| 10,792,514 B2* | 10/2020 | Ruokokoski | ........ | A61N 5/1038 |
| 10,864,382 B2* | 12/2020 | Bokrantz | ............. | A61N 5/1039 |
| 11,235,172 B2* | 2/2022 | Thornton | ............ | A61N 5/1067 |
| 11,278,737 B2* | 3/2022 | Peltola | ................... | G06F 17/10 |
| 11,426,603 B2* | 8/2022 | Kobashi | ............... | A61N 5/1037 |
| 11,517,766 B2* | 12/2022 | Bzdusek | ............. | A61N 5/1039 |
| 11,529,531 B2* | 12/2022 | Basiri | ................... | A61N 5/1031 |
| 11,559,701 B2* | 1/2023 | Fan | ...................... | A61N 5/1075 |
| 11,602,643 B2* | 3/2023 | Laaksonen | ........... | A61N 5/1031 |
| 11,642,550 B2* | 5/2023 | Peltola | ................... | A61N 5/103 378/65 |
| 11,648,418 B2* | 5/2023 | Owens | ................ | A61N 5/1067 378/65 |
| 11,654,299 B2* | 5/2023 | Nord | ..................... | A61N 5/103 378/65 |
| 11,679,273 B2* | 6/2023 | Kauppinen | .......... | A61N 5/1031 600/1 |
| 11,813,479 B2* | 11/2023 | Czeizler | ................ | A61N 5/103 |
| 11,938,341 B2* | 3/2024 | Hirvonen | ............ | A61N 5/1031 |
| 11,964,170 B2* | 4/2024 | Li | .......................... | G16H 20/40 |
| 11,992,703 B2* | 5/2024 | Lansonneur | ......... | A61N 5/1071 |
| 12,023,518 B2* | 7/2024 | Weese | ................. | A61N 5/1031 |
| 12,059,577 B2* | 8/2024 | Peltola | ................ | A61N 5/1036 |
| 12,064,647 B2* | 8/2024 | Rusanen | .............. | G16H 50/70 |
| 12,076,584 B2* | 9/2024 | Pfeiler | ................... | A61N 5/103 |
| 12,138,476 B2* | 11/2024 | Czeizler | ................ | G06N 3/08 |
| 12,138,477 B2* | 11/2024 | Ropo | .................... | A61N 5/1048 |
| 12,138,478 B2* | 11/2024 | Peltola | ................ | A61N 5/1031 |
| 12,145,002 B2* | 11/2024 | Fleischlin | ............ | A61N 5/1038 |
| 12,157,013 B2* | 12/2024 | Peltola | ................... | G16H 20/40 |
| 12,168,145 B2* | 12/2024 | Korhonen | ............. | G16H 40/60 |
| 2013/0197878 A1 | 8/2013 | Fiege | | |
| 2018/0369611 A1 | 12/2018 | Owens | | |
| 2021/0069527 A1 | 3/2021 | Peltola | | |
| 2021/0379404 A1 | 12/2021 | Basiri | | |
| 2021/0393982 A1 | 12/2021 | Lansonneur | | |

\* cited by examiner

DETECTING ANOMALOUS DOSE VOLUME HISTOGRAM INFORMATION

TECHNICAL FIELD

These teachings relate generally to treating a patient's planning target volume with energy pursuant to an energy-based treatment plan and more particularly to optimizing an energy-based treatment plan.

BACKGROUND

The use of energy to treat medical conditions comprises a known area of prior art endeavor. For example, radiation therapy comprises an important component of many treatment plans for reducing or eliminating unwanted tumors. Unfortunately, applied energy does not inherently discriminate between unwanted material and adjacent tissues, organs, or the like that are desired or even critical to continued survival of the patient. As a result, energy such as radiation is ordinarily applied in a carefully administered manner to at least attempt to restrict the energy to a given target volume. A so-called radiation treatment plan often serves in the foregoing regards.

A radiation treatment plan typically comprises specified values for each of a variety of treatment-platform parameters during each of a plurality of sequential fields. Treatment plans for radiation treatment sessions are often automatically generated through a so-called optimization process. As used herein, "optimization" will be understood to refer to improving a candidate treatment plan without necessarily ensuring that the optimized result is, in fact, the singular best solution. Such optimization often includes automatically adjusting one or more physical treatment parameters (often while observing one or more corresponding limits in these regards) and mathematically calculating a likely corresponding treatment result (such as a level of dosing) to identify a given set of treatment parameters that represent a good compromise between the desired therapeutic result and avoidance of undesired collateral effects.

A radiation treatment plan for a given patient may, in some application settings, be automatically generated. In at least most application settings, such a radiation treatment plan must be evaluated to determine whether to accept the plan for use when administering therapeutic radiation to that patient. Such an evaluation often considers such things as dosimetrics, dose coverage, dose homogeneity, and dose conformity. The applicant has determined, however, that other factors may also be considered to more effectively determine whether to accept a given radiation treatment plan.

BRIEF DESCRIPTION OF THE DRAWINGS

The above needs are at least partially met through provision of the apparatus and method for detecting anomalous dose volume histogram information described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, these various embodiments provide for automatically assessing when a dose volume histogram that corresponds to a particular radiation treatment plan presents one or more anomalies.

Pursuant to these teachings, a control circuit accesses a radiation treatment plan for a given patient. The control circuit then generates dose volume histogram information as a function of the radiation treatment plan and automatically assesses the dose volume histogram information to identify any anomalous results. Generating that information can comprise, at least in part and for example, generating at least one dose volume histogram curve. The latter may comprise generating at least one dose volume histogram curve for each of a plurality of different patient structures (such as one or more treatment volumes and/or one or more organs-at-risk).

By one approach, these teachings will accommodate automatically assessing the dose volume histogram information by, at least in part, determining a distance between the dose volume histogram information and reference information. That reference information may be generated, for example, as a function of dose volume histogram results that correspond to other radiation treatment plans.

In response to identifying an anomalous result, these teachings will accommodate presenting information regarding that anomalous result to a user. If desired, the latter can comprise interactively presenting such information to the user such that the user can modify at least one parameter of a radiation treatment plan optimization process. When no anomalous results are identified, these teachings will support using the corresponding optimized radiation treatment plan to apply therapeutic radiation to the given patient.

So configured, anomalies in dose volume histogram curves can be automatically detected and such anomalies then utilized in plan evaluation and/or optimization. These teachings are highly flexible in practice and will accommodate using adjustable criteria, such as adjustable distance metrics, when detecting anomalies. These teachings will also accommodate considering whether a particular detected anomaly is potentially problematic or instead of little or no negative consequence.

Figure 1:
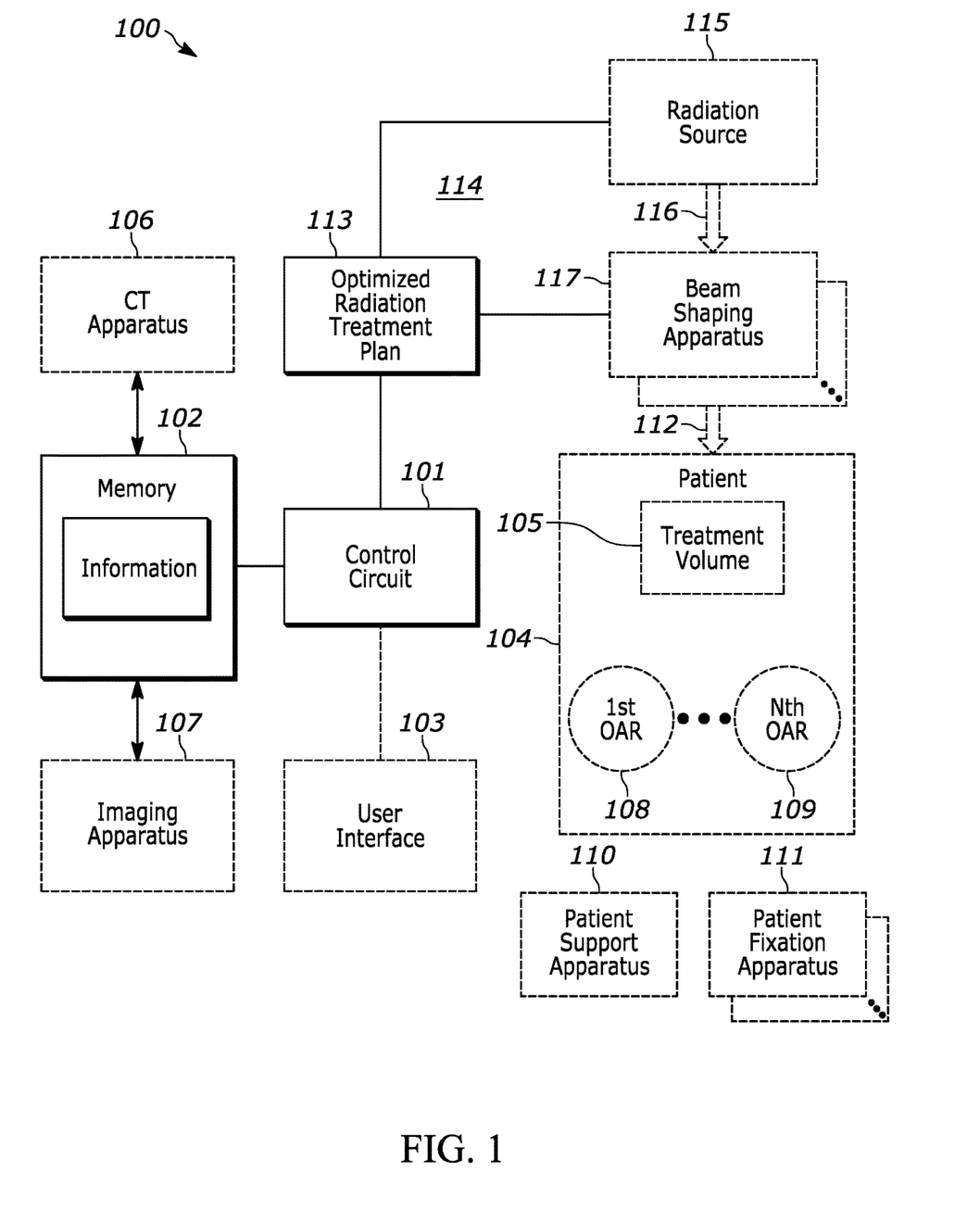
FIG. 1 comprises a block diagram as configured in accordance with various embodiments of these teachings.

These and other benefits may become clearer upon making a thorough review and study of the following detailed description. Referring now to the drawings, and in particular to FIG. 1, an illustrative apparatus 100 that is compatible with many of these teachings will first be presented.

In this particular example, the enabling apparatus 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

The control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

In addition to information such as optimization information for a particular patient and information regarding a particular radiation treatment platform as described herein, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

By one optional approach the control circuit 101 also operably couples to a user interface 103. This user interface 103 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

If desired the control circuit 101 can also operably couple to a network interface (not shown). So configured the control circuit 101 can communicate with other elements (both within the apparatus 100 and external thereto) via the network interface. Network interfaces, including both wireless and non-wireless platforms, are well understood in the art and require no particular elaboration here.

By one approach, a computed tomography apparatus 106 and/or other imaging apparatus 107 as are known in the art can source some or all of any desired patient-related imaging information.

In this illustrative example the control circuit 101 is configured to ultimately output an optimized energy-based treatment plan (such as, for example, an optimized radiation treatment plan 113). This energy-based treatment plan typically comprises specified values for each of a variety of treatment-platform parameters during each of a plurality of sequential exposure fields. In this case the energy-based treatment plan is generated through an optimization process, examples of which are provided further herein.

By one approach the control circuit 101 can operably couple to an energy-based treatment platform 114 that is configured to deliver therapeutic energy 112 to a corresponding patient 104 having at least one treatment volume 105 and also one or more organs-at-risk (represented in FIG. 1 by a first through an Nth organ-at-risk 108 and 109) in accordance with the optimized energy-based treatment plan 113. These teachings are generally applicable for use with any of a wide variety of energy-based treatment platforms/apparatuses. In a typical application setting the energy-based treatment platform 114 will include an energy source such as a radiation source 115 of ionizing radiation 116.

By one approach this radiation source 115 can be selectively moved via a gantry along an arcuate pathway (where the pathway encompasses, at least to some extent, the patient themselves during administration of the treatment). The arcuate pathway may comprise a complete or nearly complete circle as desired. By one approach the control circuit 101 controls the movement of the radiation source 115 along that arcuate pathway, and may accordingly control when the radiation source 115 starts moving, stops moving, accelerates, de-accelerates, and/or a velocity at which the radiation source 115 travels along the arcuate pathway.

As one illustrative example, the radiation source 115 can comprise, for example, a radio-frequency (RF) linear particle accelerator-based (linac-based) x-ray source. A linac is a type of particle accelerator that greatly increases the kinetic energy of charged subatomic particles or ions by subjecting the charged particles to a series of oscillating electric potentials along a linear beamline, which can be used to generate ionizing radiation (e.g., X-rays) 116 and high energy electrons.

A typical energy-based treatment platform 114 may also include one or more support apparatuses 110 (such as a couch) to support the patient 104 during the treatment session, one or more patient fixation apparatuses 111, a gantry or other movable mechanism to permit selective movement of the radiation source 115, and one or more energy-shaping apparatuses (for example, beam-shaping apparatuses 117 such as jaws, multi-leaf collimators, and so forth) to provide selective energy shaping and/or energy modulation as desired.

In a typical application setting, it is presumed herein that the patient support apparatus 110 is selectively controllable to move in any direction (i.e., any X, Y, or Z direction) during an energy-based treatment session by the control circuit 101. As the foregoing elements and systems are well understood in the art, further elaboration in these regards is not provided here except where otherwise relevant to the description.

Figure 2:
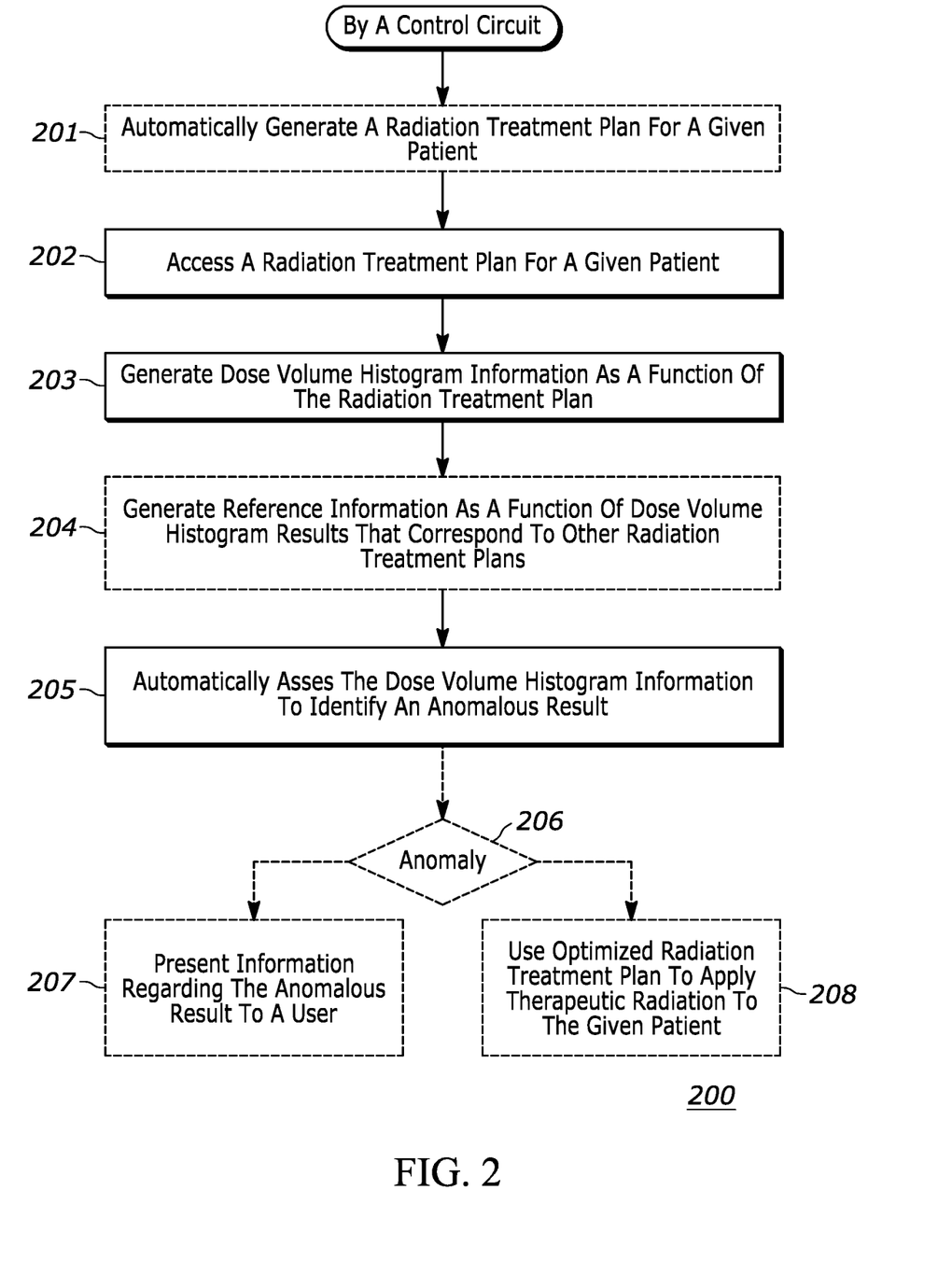
FIG. 2 comprises a flow diagram as configured in accordance with various embodiments of these teachings.

Referring now to FIG. 2, a process 200 that can be carried out, for example, in conjunction with the above-described application setting (and more particularly via the aforementioned control circuit 101) will be described. Generally speaking, this process 200 serves to facilitate generating an optimized radiation treatment plan 113 to thereby facilitate treating a particular patient with therapeutic radiation using a particular radiation treatment platform per that optimized radiation treatment plan.

At block 201, this process 200 provides for optionally automatically generating a radiation treatment plan for a given patient. Various approaches in these regards are well understood. As these teachings are not overly sensitive to any particular selection in these regards, no further elaboration is provided here for the sake of brevity.

At block 202, this process 200 provides for accessing a radiation treatment plan for a given patient. This accessed radiation treatment plan may be the automatically generated plan referred to above.

At block 203, this process provides for generating dose volume histogram information as a function of the accessed radiation treatment plan. The foregoing may comprise, for example, generating at least one dose volume histogram curve. In many application settings, it will be beneficial to generate at least one dose volume histogram curve for each of a plurality of different patient structures (including, but not limited to, the target treatment volume and any relevant organs-at-risk).

Dose volume histograms ("DVH's") are known in the art and typically represent three-dimensional dose distributions in a graphical two-dimensional format (the three-dimensional dose distributions being created, for example, in a computerized radiation-treatment planning system based on a three-dimensional reconstruction of an X-ray computed tomography scan and study). The "volume" referred to in DVH analysis can be, for example, the radiation-treatment target, a healthy organ located near such a target, an arbitrary structure, and so forth.

DVH's are often visualized in either of two ways: as differential DVH's or as cumulative DVH's. With differential DVH's column height for a given dose bin corresponds to the volume of the structure that receives that dose. Bin doses typically extend along the horizontal axis while structure volumes (either percent or absolute volumes) extend along the vertical axis.

A cumulative DVH is typically plotted with bin doses along the horizontal axis but has a column height for the first bin that represents the volume of structure(s) that receive greater than or equal to that dose. The column height of the second bin then represents the volume of structure(s) that receive greater than or equal to that dose, and so forth. With high granularity a cumulative DVH often appears as a smooth line graph. For many application settings cumulative DVH's are preferred over differential DVH's but this process 200 can accommodate either approach.

At optional block 204, this process 200 will accommodate generating reference information as a function of dose volume histogram results that correspond to other radiation treatment plans. It may be helpful if those other radiation treatment plans all correspond to plans to treat a common treatment area within a corresponding patient. For example, all of the other radiation treatment plans may pertain to a treatment area that includes (and/or that is limited to) a particular organ, tissue, or body area such as the chest or neck.

In a typical application setting, most or all of this reference information will be generated or otherwise accessed from an appropriate external source in advance of carrying out the other steps of this process 200. There may be cases, however, where the already-available reference information might be supplemented with newly-generated content that is developed at the time of need, or even cases where the entire set of reference information is developed at the time of need.

At block 205, this process 200 provides for automatically assessing the foregoing dose volume histogram information to identify an anomalous result (should such be present). By one approach, this automatic assessment comprises determining a distance between the dose volume histogram information and reference information such as, but not limited to, the aforementioned generated reference information.

Upon detecting at least one anomaly at block 206, at block 207 these teachings will optionally accommodate responsively presenting information regarding the anomalous result to a user via the aforementioned user interface 103. By one approach, this can comprise interactively presenting such information such that the user can modify at least one parameter of the radiation treatment plan optimization process that yielded the aforementioned access radiation treatment plan. In particular, the user can generate a modified radiation treatment plan that can then again be assessed per this process 200. For example, the user might adjust the objective locations, beam geometry, or some other optimization parameter of choice and then re-run the optimization process. Such an optimization, plan generation, and anomaly-detection process can be repeated until a satisfactory result is achieved.

By one illustrative approach, the user would be presented with information showing the anomalous dose volume histograms explicitly emphasized. For example, color codes could be used to point out the parts of the dose volume histogram curve that lead it to be classified as anomalous. By another approach, in lieu of the foregoing or in combination therewith, the user could click or otherwise select a depicted button (or the like) to bring up an additional window that presents additional relevant numerical information (for example, the information regarding the reference distribution in the given case, the anomality criterion, and/or the relative magnitude of the anomaly). If desired, a separate display or window could be shown for each anomalous dose volume histogram curve.

When no anomalies are detected, at block 208 this process 200 can provide for responsively using the corresponding optimized radiation treatment plan to apply therapeutic radiation to the given patient.

So configured, these teachings provide for anomaly-based detection that is fast, requires little computational overhead, and is numerically explainable. These teachings are also both practical and flexible in practice. For example, if desired, these teachings may be deployed in a workflow where reoptimization can be appropriately triggered without requiring human oversight or intervention.

Some further examples and details will now be provided in the foregoing regards. It will be understood that these examples and details are intended to serve an illustrative purpose and are not intended to suggest any particular limitations as regards these teachings.

These teachings will accommodate generating and/or selecting the aforementioned reference information in a selectively parsed manner. For example, a given anatomical site may be divided into multiple sub-groups. Criteria for such a division can include, for example, tumor type, tumor location, relative proximity of structures to other organs, chosen organ-at-risk trade-offs, treatment modalities and beam arrangements, treatment protocol, and achieved clinical goals. Such subdivisions variance within a given subgroup such that anomaly detection may perhaps more meaningfully recognize anomalies without confusion and/or noise introduced by other portions of the anatomical site.

The aforementioned distance metrics for the dose volume histogram anomaly detection can be based on the overall shape of the dose volume histogram curve. The dose volume histogram curves in this example are defined as monotonically decreasing histograms. They can be presented as a one-dimensional function mapping the relative volume y in [0,1] into the relative dose d in [0, d_max/d_goal]. This approach yields the numerical relation d=DVH(y).

One approach to determining the distance between a current dose volume histogram curve and previously observed dose volume histogram curves that comprise the aforementioned reference information includes performing a dimensional reduction to the dose volume histogram curves:

$$\text{DVH curve} \rightarrow \{z\_i\} \quad \text{(Equation 1)}$$

where each z_i is a scalar value and i=0 . . . n_i.

One example of the dimensional reduction includes integrating the dose volume historgram with a suitable weight function(s):

$$z\_i = \text{Integral } w\_i(y)\text{DVH}(y)dy, \text{ with integral over } y \text{ from 0 to 1.}$$

In this example, the weight functions w_i(y) can be adjusted to control how the different parts of the dose volume histogram curve are taken into account. This approach in particular can be used to emphasize some parts of the dose volume histogram curve more than other parts thereof.

These teachings will accommodate many ways to choose such weight functions. A first choice in these regards would provide for w_i(y)=1 for all y. This would mean the area under the dimensionless dose volume histogram curve. A larger value of z would accordingly indicate more radiation to the overall structure in context.

A second choice in these regards would for provide for a step function (or sum of two or more step functions) to emphasize certain part of the dose volume histogram. For example, another weight function could be defined as w_i(y)=1 when y<0.2, and w_i(y)=0 otherwise. This approach would place emphasis only on the higher dose parts that the structure in question receives.

These teachings would also accommodate including dose volume histogram point metrics by choosing the weight function to be a delta distribution (or a sum of delta distributions).

A dimensional reduction of dose volume histogram curves can also be based on a known reference dose volume histogram. For example, given a selected set of structures, one can first compute the dose volume histogram curves from a set of reference plans. It will be assumed here that this set of reference plans illustrates the reference distribution and does not contain anomalous cases. (Should that not be the case, one could filter the reference set to eliminate all anomalous cases before employing the remaining information as described herein). If the set of reference plans is homogeneous enough, one can simply compute or aggregate a reference dose volume histogram curve for each structure of interest. As one example in these regards, this can comprise by taking the mean of all dose volume histogram curves of that structure from all plans in the set. If there is too much variance within the set of the reference plans, one could first predict as much as possible of this variance by modeling the dependence of patient geometry and the dose volume histogram curve shapes.

Using this reference dose volume histogram curve one can score the dose volume histogram curve for a given structure from a new patient. This may comprise, for example, penalizing the regions in which the new dose volume histogram is above the reference dose volume histogram for organs-at-risk and respectively below the reference dose volume histogram for target volumes. The penalty could be, for instance, the area between the two curves (generating smaller scores if the curves are close to each other and larger scores when the curves differ a lot—the latter can be determined by, for example, utilizing a first threshold value to assess closeness and a second threshold value to assess a greater distance).

Figure 3:
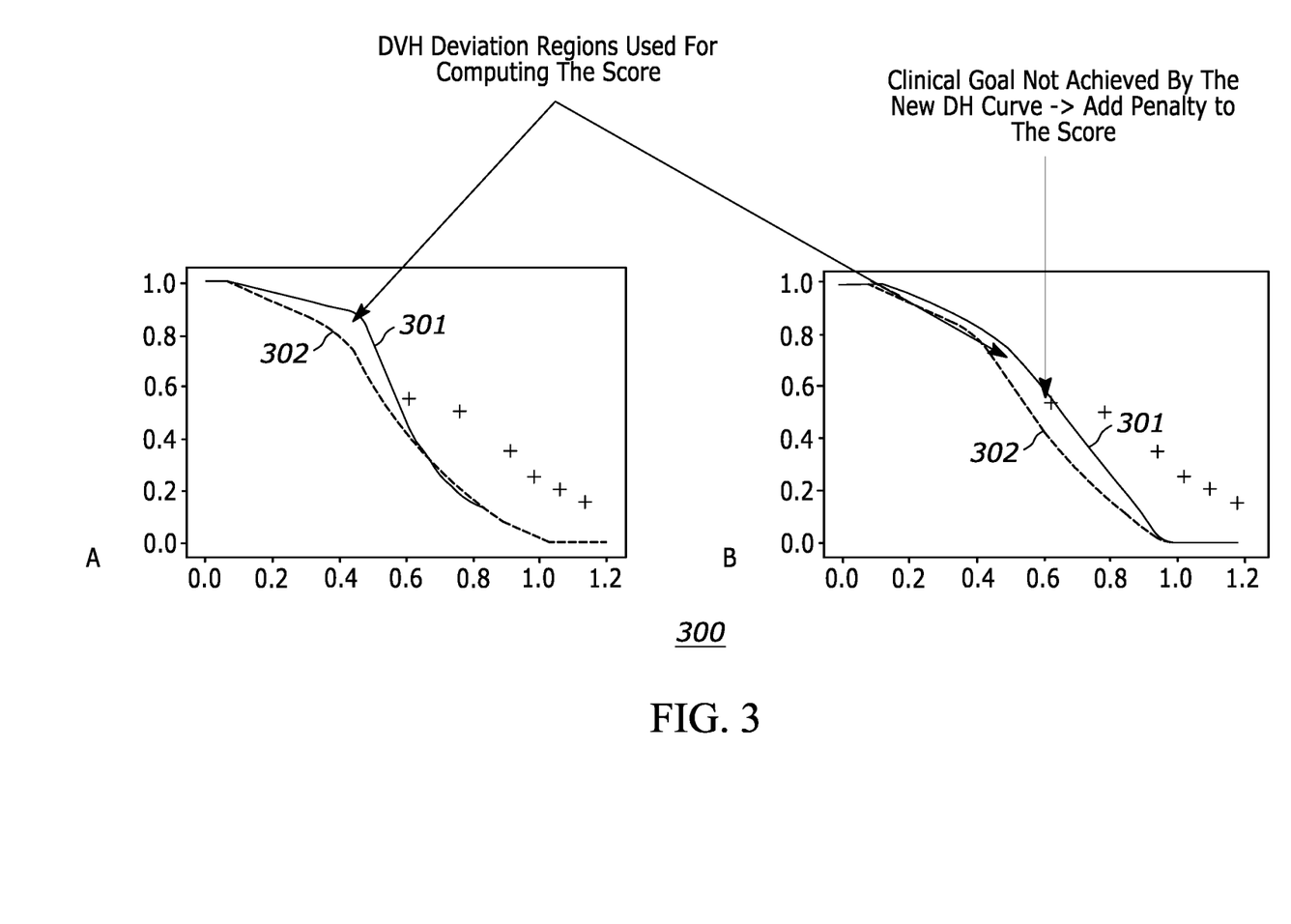
FIG. 3 comprises a graph as configured in accordance with various embodiments of these teachings.

These teachings will accommodate taking into consideration applicable clinical protocols by, for example, adding an additional penalty for each clinical goal that is not fulfilled by the dose volume histogram curve being assessed. FIG. 3 provides an illustrative example of components that can contribute to the computation of such scores. This additional penalty could be, for instance, the distance between the unfulfilled clinical goal and the point from the curve 301 that corresponds to the same dose level, multiplied by a weight value.

With continued reference to FIG. 3, the second curve 302 is the reference dose volume histogram computed for a given organ-at-risk from the reference set of plans, while the first dose volume histogram curve 301 corresponds to the radiation treatment plan being assessed for a new patient. The clinical goals for this organ-at-risk are represented by the plus signs "+." As regards the graph on the left, the score for the new dose volume histogram 301 is computed as the area between the two curves selecting only the region where the first curve 301 is above the second dose volume histogram curve 302. Since all clinical goals are achieved in this example, there is no anomaly and no need to add any additional penalty. As regards the example graph on the right, for this patient, the score of the first dose volume histogram curve 301 is computed as the area between the first and second curves in the region where the first curve 301 is above the second dose volume histogram curve 302 plus a penalty for not fulfilling the leftmost clinical goal.

If desired, one can also define two or more mappings {z_i}_1 and {z_i}_2 that are adjusted to monitor different dose volume histogram curves. For example, {z_i}_1 can monitor a certain organ and {z_i}_2 can monitor another organ (or a patient target volume). This approach may be useful when a single value may not be enough to characterize a complex situation for anomaly detection. This approach also provides a way to monitor certain trade-offs of interest or concern.

As regards forming a reference distribution for mapped representations, in the case of single mapping, these teachings will accommodate calculating the mapped representations z_i to get the reference distribution Z={z_i}, i.e. for all the patients in the chosen subset of similar reference plans. In the case that two or more mappings are considered, one can have either two or more independent reference distributions Z_1, Z_2 etc., where Z_1={z_i} and Z_2={z_j} etc., or one can form joined reference distributions (for example Z joined={z_i, z_j}).

These teachings will accommodate various approaches to accomplishing the aforementioned anomaly detection, ranging from classical statistical methods to modern outlier detection. The choice of the method can be based both on clinical and statistical (i.e., amount of data) considerations and/or pilot studies. As a simple illustration, if there is considerable reference data, one could consider the values $z\_i$ to be normally distributed. Then one could check whether a new data point deviates n sigma amount from the distribution mean to be considered an anomaly. If the distribution of values $z\_i$ is not known, or the distribution is non-normal, there are likewise other corresponding methods to estimate anomalies (for example, nearest-neighbor methods).

If joined reference distributions are considered, there are similarly various ways to set up the anomaly detection (for example, cluster-based methods).

The anomaly detection criterion can be chosen so that the criterion allows for distinguishing between positive and negative outliers. For example, it may be clear from the definition of mapping in a particular instance that higher values of mapped representation mean more dose is being applied to a critical organ. In this case, one could simply do a sided anomaly detection, i.e., testing whether the mapped values are significantly higher (a positive outlier) as compared to the reference distribution. In such a case, one could omit testing of the lower side, since such cases are negative outliers and the dose volume histogram curve would assuredly be clinically satisfactory.

When using a reference dose volume histogram curve for anomaly detection, one could also use the non-parametric Kolmogorov-Smirnov test to compare the dose volume histogram curve for a new patient with the reference dose volume histogram curve.

As yet another example, based upon the reference information one may calculate the mean+/−2 standard deviation dose volume histogram curves for that information to thereby define a region bounded by those two resultant curves. A dose volume histogram curve being assessed can be compared to that region to identify and detect points where the curve outlies the region on either side thereof.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A method comprising:
    by a control circuit:
        accessing a radiation treatment plan for a given patient;
        generating dose volume histogram information as a function of the radiation treatment plan; and
        automatically assessing the dose volume histogram information to identify an anomalous result.

2. The method of claim 1 wherein generating the dose volume histogram information comprises, at least in part, generating at least one dose volume histogram curve.

3. The method of claim 1 wherein generating the dose volume histogram information comprises, at least in part, generating at least one dose volume histogram curve for each of a plurality of different patient structures.

4. The method of claim 1 wherein automatically assessing the dose volume histogram information to identify an anomalous result comprises, at least in part, determining a distance between the dose volume histogram information and reference information.

5. The method of claim 4 further comprising:
    generating the reference information as a function of dose volume histogram results that correspond to other radiation treatment plans.

6. The method of claim 5 wherein the other radiation treatment plans all correspond to plans to treat a common treatment area within a corresponding patient.

7. The method of claim 1 further comprising:
    in response to identifying an anomalous result, presenting information regarding the anomalous result to a user.

8. The method of claim 7 wherein presenting the information regarding the anomalous result to a user comprises interactively presenting the information regarding the anomalous result to the user such that the user can modify at least one parameter of an optimization process of a radiation treatment plan.

9. The method of claim 1 further comprising:
    in response to automatically assessing that the dose volume histogram information does not identify an anomalous result, using a corresponding optimized radiation treatment plan to apply therapeutic radiation to the given patient.

10. The method of claim 1 further comprising:
    automatically generating the radiation treatment plan for the given patient.

11. An apparatus comprising:
    a control circuit configured to:
        access a radiation treatment plan for a given patient;
        generate dose volume histogram information as a function of the radiation treatment plan; and
        automatically assess the dose volume histogram information to identify an anomalous result.

12. The apparatus of claim 11 wherein the control circuit is configured to generate the dose volume histogram information by, at least in part, generating at least one dose volume histogram curve.

13. The apparatus of claim 11 wherein the control circuit is configured to generate the dose volume histogram information by, at least in part, generating at least one dose volume histogram curve for each of a plurality of different patient structures.

14. The apparatus of claim 11 wherein the control circuit is configured to automatically assess the dose volume histogram information to identify an anomalous result by, at least in part, determining a distance between the dose volume histogram information and reference information.

15. The apparatus of claim 14 wherein the control circuit is further configured to:
    generate the reference information as a function of dose volume histogram results that correspond to other radiation treatment plans.

16. The apparatus of claim 15 wherein the other radiation treatment plans all correspond to plans to treat a common treatment area within a corresponding patient.

17. The apparatus of claim 11 wherein the control circuit is further configured to:
    in response to identifying an anomalous result, present information regarding the anomalous result to a user.

18. The apparatus of claim 17 wherein the control circuit is configured to present the information regarding the anomalous result to a user by interactively presenting the information regarding the anomalous result to the user such that the user can modify at least one parameter of an optimization process of a radiation treatment plan.

19. The apparatus of claim 11 wherein the control circuit is further configured to:
    in response to automatically assessing that the dose volume histogram information does not identify an anomalous result, use a corresponding optimized radiation treatment plan to apply therapeutic radiation to the given patient.

20. The apparatus of claim 11 wherein the control circuit is further configured to:

automatically generate the radiation treatment plan for the given patient.

* * * * *